March 29, 1932.  J. J. BURTON  1,851,807

MEANS FOR DRYING HIDES, SKINS, LEATHER, PLYWOOD, AND OTHER PRODUCTS

Filed Aug. 9, 1929  2 Sheets-Sheet 1

J. J. Burton
Inventor
By Marks + Clerk
Attorneys

March 29, 1932.  J. J. BURTON  1,851,807

MEANS FOR DRYING HIDES, SKINS, LEATHER, PLYWOOD, AND OTHER PRODUCTS

Filed Aug. 9, 1929   2 Sheets-Sheet 2

J. J. Burton
Inventor
By Marks & Clerk
Attorneys

Patented Mar. 29, 1932

1,851,807

UNITED STATES PATENT OFFICE

JOHN JAMES BURTON, OF BRISBANE, QUEENSLAND, AUSTRALIA

MEANS FOR DRYING HIDES, SKINS, LEATHER, PLYWOOD, AND OTHER PRODUCTS

Application filed August 9, 1929. Serial No. 384,723.

The usual practice, when drying hides, skins, and the like, is to hang them out in the open or under some primitive cover on wooden rails, poles, or wire strung between posts, so as to expose them to the wind. With leather, the hides are generally hung in sheds with louvered sides so that the wind may be excluded or admitted as may be required. These are fairly satisfactory so long as the climatic conditions remain favourable. During unfavourable weather drying cannot be done and the conditions generally are most unsatisfactory. Work is then held up, the time required is most uncertain, the products deteriorate and consequently suffer in value, and it not infrequently happens that markets for the products are lost, thus re-acting on the pecuniary benefits. Plywood and the like are generally dried in open sheds, but these, like other materials that require drying, are practically dependent on weather conditions, all of which disadvantages constitute a serious hindrance to the industries. However, these disadvantages can be obviated by the invention. By its use the product is dried evenly in a much shorter time and under any weather conditions, the rate and extent of drying being controlled as desired. The operation of drying can be carried out in the hide stores, tanneries, killing yards, or wherever desired.

In carrying out my invention I construct a closed chamber having doors to enable the hides, skins, or other products that are to be dried to be placed therein. The hides, skins, or other products are carried by frames on trucks which run or are rigidly built within the chamber. Dry, wet, hot, or cold air, of the desired temperature and humidity, is supplied and distributed within the chamber from ducts beneath the floor through movable cross distributing slotted or holed nozzles. An exhaust air duct is provided along the apex of the roof, deflectors and openings in the roof being provided for directing the current of air from the chamber to the exhaust duct.

Figure 1:
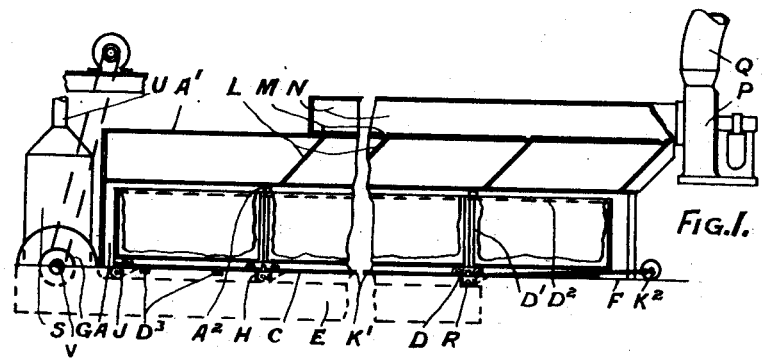
Figure 2:
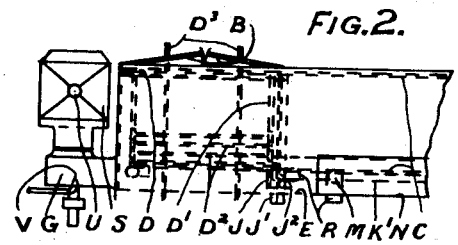
Figures 3, 4:
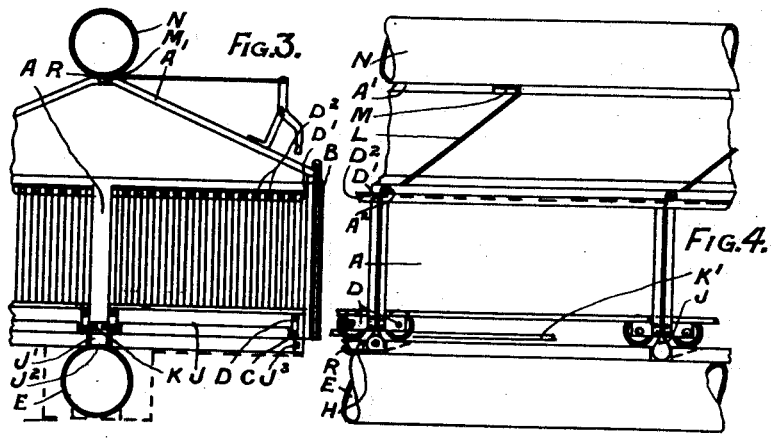
Figure 5:
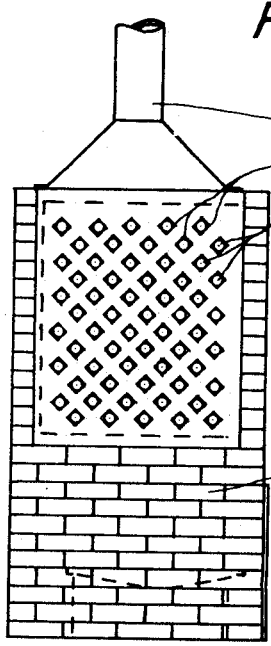
Figure 6:
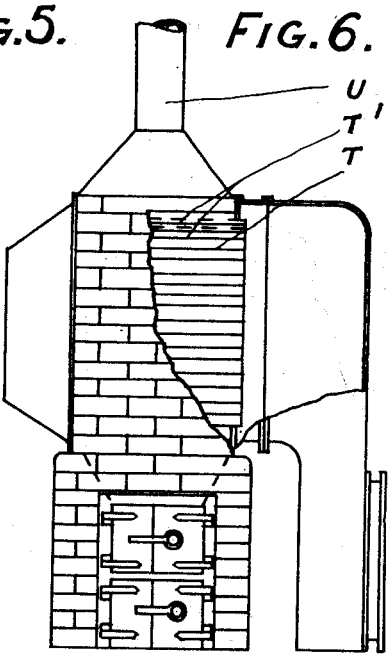
Figure 7:
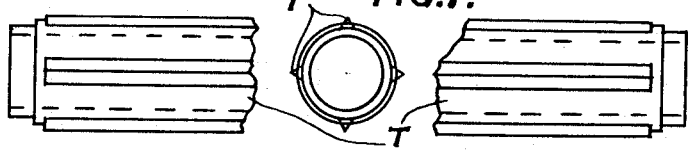
Figures 8, 9:
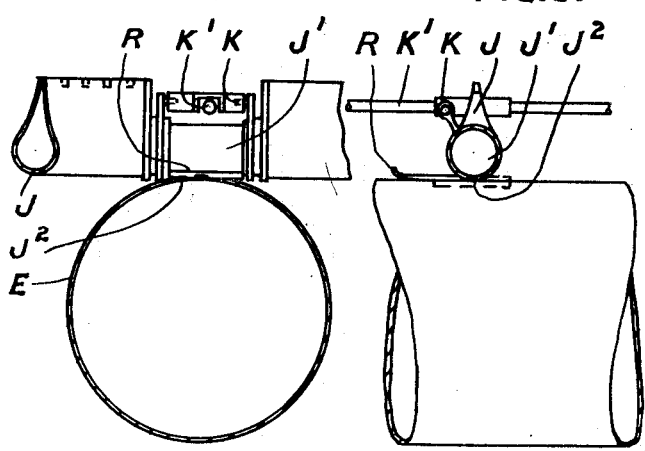

These and other improved details will be more fully described in relation to the drawings, in which Fig. 1 is a broken side sectional elevation;
Fig. 2 is a broken plan;
Fig. 3 is a broken transverse sectional elevation;
Fig. 4 is a part side elevation;
Fig. 5 is a side elevation of a portion of the invention;
Fig. 6 is a front elevation of same, part being in section;
Fig. 7 is a broken elevation and section of a detail;
Figs. 8 and 9 are longitudinal and transverse detail views respectively.

In carrying out my invention I construct a closed chamber A of the desired size and preferably longitudinal with an inverted V roof A1. Doors B are provided on each side of the chamber A at each end thereof or where found most suitable. Hinged or sliding doors may be used, and, as an alternative arrangement, doors B may be provided along the full length of each side. Windows may be placed where desired so that the operation of drying may be observed from time to time. Longitudinal rails C are provided on the floor to carry suitable trucks D. These trucks D support frames D1, which, in turn, carry rods D2 on which the hides, skins, leather, or the like are hung. The frames D1 may be rigidly built in the chamber A. These rods D2 have enlarged or T ends in order that they may be kept the required distance apart and are preferably slid in grooves on the frame. Plywood and the like would be supported on the truck, the rods D2 or distance pieces being provided so that they would be kept the desired distance apart. Hooks would be provided on the frames for hanging the leather. The trucks D are moved into and out of the enclosures at each end on supporting trucks (not shown) of ordinary construction and having platforms, which may be raised or lowered at will, running on cross rails D3.

A roller blind A2 or other screen or removable partition may be provided between each truck D or each set of frames D1 so that the chamber A may be divided into compartments.

A longitudinal air duct E under the floor

F of the chamber A leads from a pressure fan G driven from any source of power supply and controlled as desired. Openings H are provided in the floor beneath one end of each of the trucks D or at the near end of each compartment, and through them transverse slotted or holed nozzles J project. These nozzles J are carried at one end by the T or three-way fitting J1 having openings J2 to the duct E, and at the other end by suitable end thrust anti-friction bearings J3.

The nozzles are operated radially so that they can be moved back and forth from the vertical to the horizontal by suitable mechanism, such as by the cranks K, rods K1, and crank disc K2 driven from a source of power supply so that the continuous draught of air through the slotted or holed nozzles J extending the full width of the chamber A, may be directed into all parts of the particular portion thereof. Provision is made whereby one or more of the nozzles J may be disconnected, if desired.

Deflectors L, provided in the roof A1 of the chamber A, slope from the ends of the tops of the trucks D or partitions A2 to the apex of the roof, where openings M lead to an exhaust duct N connected to an exhaust fan P driven from a source of power supply and suitably controlled. The air drawn from the chamber is exhausted to atmosphere through exhaust pipe Q.

Slide or other doors R are fitted so that the passage of air through any or all of the openings J2 M and/or ducts E N may be controlled as desired.

Dry air is required for the purpose of drying certain products, and, under ordinary climatic conditions, no further apparatus is required, but a furnace for drying, but not heating, the air is provided for use when humid conditions prevail. For this purpose I provide a furnace S wherein the air passes through tubes T, around which heated gases from a coke or other fire pass to the chimney U. The tubes T are preferably formed with fins T1 on the outer surface, as shown in Fig. 7, to increase the heating area and prevent sagging. The air may be dried by means of a steam coil.

Alternatively, the air may be heated for drying certain materials, and again, for other materials, such as leather, it may be desired that wet air be used. For this purpose, water may be forced or induced through an atomizing jet V into the air duct. The air is forced into the chamber as a gentle breeze or with a much greater velocity, as required, according to the material being treated, by regulating the opening of the doors in the inlet and exhaust ducts.

I do not wish to bind myself to the details of construction, as these can be varied to suit the ideas of the designer or constructor without interfering with the essential features of the invention. Metals and other materials would be used as best suited for the respective purposes.

Having now particularly described and ascertained the nature of my said invention and in what manner the same is to be performed, I declare that what I claim is:—

1. Improved means for drying hides, skins, leather, plywood, and other products, comprising a closed chamber, an air supply duct connected to means for air supply of the required temperature and humidity and arranged longitudinally beneath said chamber, a floor in the chamber having transverse openings therein, transverse slotted or holed nozzles positioned in the transverse floor openings connected to said longitudinal air duct, pivotally carried and adapted to be moved back and forth from the vertical to the horizontal, and means for operating same, as and for the purposes herein set forth.

2. Improved means for drying hides, skins, leather, plywood, and other products, comprising the parts as claimed in claim 1 in combination with a roof having exhaust openings in its apex diagonal deflectors in the roof of said chamber for directing the air flow to said openings, an exhaust duct connected with the roof openings, and means for exhausting the air from the exhaust duct.

3. Improved means for drying hides, skins, leather, plywood, and other products, comprising the parts claimed in claim 1, in combination with means for regulating the induction, and exhaust respectively into and from said closed chamber.

4. Improved means for drying hides, skins, leather, plywood, and other products, comprising the parts claimed in claim 1, in combination with means for carrying said products consisting of trucks, frames on said trucks on which said products are suspended or carried, as and for the purposes herein set forth.

5. In improved means for drying hides, skins, leather, plywood, and other products, means for drying and heating (as required) air as it passes on its way to a closed chamber in an apparatus as claimed in claim 1 containing said products, as and for the purposes herein set forth.

6. In improved means for drying hides, skins, leather, plywood, and other products, an atomizing water jet for wetting the air as it passes on its way to a chamber containing said products in an apparatus, as claimed in claim 1, as and for the purposes herein set forth.

In testimony whereof I affix my signature.

JOHN JAMES BURTON.